(12) United States Patent
Quaing

(10) Patent No.: US 7,980,575 B2
(45) Date of Patent: Jul. 19, 2011

(54) FOUR-POINT LINK

(75) Inventor: Matthias Quaing, Emsburen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/597,024

(22) PCT Filed: May 6, 2008

(86) PCT No.: PCT/DE2008/050012
§ 371 (c)(1),
(2), (4) Date: Oct. 22, 2009

(87) PCT Pub. No.: WO2008/138333
PCT Pub. Date: Nov. 20, 2008

(65) Prior Publication Data
US 2010/0127469 A1     May 27, 2010

(30) Foreign Application Priority Data

May 10, 2007 (DE) .......................... 10 2007 022 411

(51) Int. Cl.
*B60G 9/02* (2006.01)
*B60G 21/05* (2006.01)
(52) U.S. Cl. ................................. 280/124.116; 180/358
(58) Field of Classification Search ........... 280/124.153, 280/124.128, 124.107, 124.116, 124.11, 280/793, 794; 267/230; 180/358
See application file for complete search history.

(56) References Cited

U.S. PATENT DOCUMENTS

| | | | | |
|---|---|---|---|---|
| 2,299,935 A | * | 10/1942 | Slack et al. | 280/124.134 |
| 5,133,575 A | * | 7/1992 | Zantinge et al. | 280/6.159 |
| 6,129,367 A | | 10/2000 | Bublies et al. | |
| 6,527,286 B2 | * | 3/2003 | Keeler et al. | 280/124.135 |
| 6,637,762 B2 | * | 10/2003 | Bublies et al. | 280/124.11 |
| 6,808,191 B1 | * | 10/2004 | Buhl et al. | 280/124.107 |
| 2006/0244232 A1 | * | 11/2006 | Cortez et al. | 280/124.116 |
| 2007/0284841 A1 | | 12/2007 | Kunze et al. | |

FOREIGN PATENT DOCUMENTS

| | | |
|---|---|---|
| DE | 100 50 772 A1 | 4/2002 |
| DE | 10050773 A1 * | 4/2002 |
| DE | 10236084 A1 * | 2/2004 |
| DE | 10 2004 014 610 A1 | 10/2005 |
| EP | 743205 A1 * | 11/1996 |
| EP | 0 776 275 A1 | 6/1997 |
| EP | 1231083 A2 * | 8/2002 |

* cited by examiner

Primary Examiner — Faye M. Fleming
Assistant Examiner — Keith Frisby
(74) Attorney, Agent, or Firm — Davis & Bujold, P.L.L.C.

(57) ABSTRACT

A four-point link for suspending a vehicle axle (36) on a vehicle frame (35) of a vehicle (11). The four-point link includes four link arms (2, 3, 4 and 5) which are fixed to one another by a central region (6) and which extend away from the central region (6) to form a cross. Two first link arms (2, 3) may be connected, in an articulated manner, to the vehicle frame (35) and two second link arms (4, 5) may be connected, in an articulated manner, to the vehicle axle (36). Each of the link arms (2, 3, 4, 5) has an H-shaped profile (13) which is open transverse or vertically with respect to the cross plane (20).

20 Claims, 3 Drawing Sheets ial no. 10 2007 022 411.9

FOUR-POINT LINK

This application is a National Stage completion of PCT/DE2008/050012 filed May 6, 2008, which claims priority from German patent application serial no. 10 2007 022 411.9 filed May 10, 2007.

FIELD OF THE INVENTION

The present invention relates to a four-point link for suspending a vehicle axle on a vehicle frame of a vehicle, comprising four link arms which are fixedly connected to one another in a central region and which extend away from the central region forming a cross, of which two first link arms may be connected in an articulated manner to the vehicle frame and two second link arms may be connected in an articulated manner to the vehicle axle. The invention further relates to a vehicle comprising such a four-point link.

BACKGROUND OF THE INVENTION

From EP 0 776 275 B1 an axle suspension for rigid axles of vehicles is known, wherein the vehicle axle is connected to the vehicle body by means of longitudinal control arms and a four-point link. Articulated joints for fixation to the vehicle body and articulated joints for fixation to the vehicle axle are arranged at the arm ends of the four-point link configured as an X-shaped cross. The cross-sectional profile of the arms may be double T-shaped or comprise a hollow profile.

DE 100 50 772 A1 discloses an axle suspension for rigid axles of vehicles, comprising two trailing links connecting the rigid axle to the vehicle body and a four-point linkage, which is both connected in an articulated manner to the rigid axle and connected in an articulated manner to the vehicle body. The four-point link comprises a hollow component extending parallel to the longitudinal direction of the vehicle, at the end of which two articulated arms are provided that are arranged symmetrically to the longitudinal axis of the component and fastened thereon.

DE 10 2004 014 610 A1 describes an X-shaped four-point suspension arm for the suspension of a rigid axle of a commercial vehicle, comprising a central, hollow housing region and four link arms integrally molded on the housing region, at the outer ends of which bearing lugs provided with ball joints and/or elastomer joints are integrally molded. The hollow housing of the four-point link is open on both sides and has a tubular shape, and is waisted on all four sides. The link arms further have a U-shaped or C-shaped cross-section and merge smoothly into the central, tubular housing region. The hollow housing may be configured as a sheet metal part or cast iron part, wherein the four-point link is made, for example, of bainitic cast iron.

In practice, for manufacturing reasons, cost reasons, strength reasons and weight reasons, two shapes have proven especially efficient. This is the X-shape on the one hand, which has been manufactured primarily by forging. In this case, for manufacturing reasons, a solid rectangular cross-section is achieved as the arm cross-section, which may be adjusted in a relatively simple manner to the required characteristic and strength properties. The disadvantage for more economical production, for example by casting, of a hollow geometry according to EP 0 776 275 B1 is that they are completely closed. As a result, process-reliable support of the core forming the hollow space is not possible, or only with a lot of restrictions. This may produce irregular wall thicknesses, and thus negative strength properties, from core floating during casting. The disadvantages of the existing X-geometry produced by forging is the rectangular cross-section thereof predetermined by the production method, resulting in heavy components and consequently high costs. For a torsionally flexible forged four-point link, the arms are normally configured very flat. This may result in the problem that the housing heads are not completely filled during forging. An X-geometry with a double T-shaped arm cross-section requires several cores for casting, which increases the cost of the component. In addition, the double-T profile is disadvantageous for lateral loads.

On the other hand, the casting design open on both sides according to DE 10 2004 014 610 A1 has proven effective. This shape is characterized by cost-effective and lightweight forging as well as by the hollow construction, and thus offers several advantages compared to the forged four-point link. The design, however, reaches its limit with flexible torsional characteristics. In order to configure a more flexible characteristic, for example, either the wall thickness or the core height is reduced. Both measures, however, have manufacturing barriers. The wall thickness should have a minimum dimension so that the component can be cast, and the core should have a minimum height so that it does not break due to the buoyancy of the liquid cast iron. Therefore, this shape is less suitable for the application of a torsionally flexible characteristic. A reduction in the torsional characteristics by means of a narrower component is only possible to a very limited extent for reasons of operational stability.

In the four-point link according to DE 100 50 772 A1, which substantially comprises a tube with small arms for connection, the torsional characteristic is determined almost exclusively by the tube. The disadvantage of this design is the manufacturing technology. The geometry of the four-point link can normally not be forged because of to the tubular profile. In addition, the four-point link is suitable for production by casting only to a limited extent, because the inside diameter should not be below a minimum dimension due to the required stability of the long core. As the arms are configured as a rectangular profile, there is the risk of blowhole formation if they are not configured very thin. In addition, this geometry is not designed appropriate to the load. With torsionally flexible characteristics, the tubular profile in the center has to be very thin, or have a small cross-section, and thus offers little resistance to lateral loads. The arms configured as a thin rectangular profile also offer little resistance to lateral loads. In addition, the link exhibits changes in stiffness at the transition of the arms to the tube, which is disadvantageous for operational stability.

SUMMARY OF THE INVENTION

Based on this prior art, the underlying object of the invention is to provide a four-point link which is torsionally flexible and at the same time can support high lateral loads.

The four-point link according to the invention for suspending a vehicle axle on the frame of a vehicle, in particular a commercial vehicle, has four link arms fixedly connected to one another in a central region and extending away from the central region while forming a cross, of which two first link arms can be connected in an articulated manner to the vehicle frame and two second link arms can be connected in an articulated manner to the vehicle axle, wherein the link arms each have an H-shaped profile which is open transversely or vertically to the cross plane.

Each H-shaped profile is preferably formed by two limbs and a cross-member extending between the limbs, wherein the limbs and cross-member delimit two recesses, which are separated from one another by the cross-member and which are open on mutually opposed sides. The recesses are, in particular, only open on one side in this case. The expression "H-shaped profile open transversely or vertically to the cross plane" should thus be understood in particular such that the recesses of each H-shaped profile are open transversely or vertically with respect to the cross plane. On the contrary, in the double-T profile known from the prior art, the recesses are delimited transversely and/or vertically with respect to the cross plane by the limbs of the double-T profile and thus closed. Both limbs of each H-shaped profile are preferably aligned parallel or substantially parallel to one another. The cross-member of each H-shaped profile further extends, in particular, transversely or vertically relative to the respective legs.

As the link arms have an H-shaped profile which is open transversely or vertically with respect to the cross plane, the four-point link is both torsionally flexible and can support high lateral loads. The four-point link according to the invention may in particular support higher lateral loads than if the arms thereof have a double-T profile according to EP 0 776 275 B1. The H-shaped profile which is open transversely or vertically with respect to the cross plane further offers manufacturing advantages, since, in contrast to the double-T profile from EP 0 776 275 B1 or also the C-profile known from DE 10 2004 014 610 A1, it may be cast without a core. The term "transversely" preferably denotes "perpendicularly", "substantially vertically" or "obliquely". Thus, the expression "transversely with respect to the cross plane", for example, means "perpendicularly with respect to the cross plane", "substantially perpendicularly with respect to the cross plane" or "obliquely with respect to the cross plane".

The link arms preferably merge into one another in the central region, this transition taking place in a particularly homogeneous manner in terms of materials. The four-point link may further form a cross or an X-shaped cross and/or have an X-shaped figure.

The cross-plane preferably forms a center plane of the four-point link. The link arms, and preferably also the central region, are in particular located on the cross plane of the four-point link. Thus, the expression "H-shaped profile open transversely or vertically with respect to the cross plane" may in particular also be interpreted such that the cross-members of the H-shaped profile are located in the cross plane.

The link arms may extend in a straight line. The link arms are, however, preferably curved, so that the terms "cross-shaped", "cross", "X-shaped cross" or "X-shaped figure" include such a curved course of the link arms. The link arms are preferably curved in the cross plane.

The H-shaped profiles of the link arms may taper with increasing distance to the central region. In particular, the height of the limbs of the H-shaped profiles of the link arms and/or the width of the cross-members of the H-shaped profiles of the link arms and/or the width of the H-shaped profiles of the link arms, decreases with increasing distance to the central region.

According to a refinement, the central region has a tubular profile. The central region in particular has two H-shaped profiles which are each transversely or vertically open with respect to the cross plane, and which are connected to one another and/or merge into one another to form the tubular profile.

Each H-shaped profile of the central region is preferably formed by two limbs and a cross-member extending between the limbs, where the limbs and cross-member delimit two recesses, which are separated from one another by the cross-member and which are open on mutually opposing sides. The recesses are, in particular only open on one side in this case.

The expression "H-shaped profiles open transversely or vertically with respect to the cross plane" should thus be understood in particular such that the recesses of each H-shaped profile are transversely or vertically open to the cross plane. This expression may also preferably be interpreted such that the cross-members of the H-shaped profiles of the central region are located in the cross plane. Both limbs of each H-shaped profile of the central region are preferably aligned parallel or substantially parallel to one another. The cross-member of each H-shaped profile of the central region further in particular extends transversely or vertically with respect to the respective legs.

The limbs of the H-shaped profiles of the central region facing one another to form the tubular profile are preferably connected to one another such that the central region is in particular arranged between the limbs of the two H-shaped profiles of the central region. The H-shaped profiles of the link arms thus preferably merge into the H-shaped profiles of the central region. The tubular profile is preferably configured in the shape of an O. Both limbs of the H-shaped profiles of the central region facing one another may preferably be curved toward one another to form the tubular profile.

The tubular profile is, in particular, open on both sides. The tubular profile further preferably extends in the longitudinal direction of the cross and/or of the four-point link, which in particular extends centrally between the two first link arms and centrally between the two second link arms. The longitudinal direction also extends through the central region.

The link arms preferably have a joint receiving means at each end thereof facing away from the central region, wherein a joint is arranged or may be arranged on or in the receiving means. Both first link arms may thus be connected in an articulated manner to the vehicle frame by means of the joints, and both second link arms may be connected in an articulated manner to the vehicle axle by means of the joints. The bearing supports are preferably configured as hollow cylinders. The joints are further configured as ball joints and/or as molecular joints.

The four-point link preferably comprises metal, in particular iron or an iron alloy. The four-point link may further be manufactured as a forged part or cast part. The four-point link is preferably a cast part, and is made of a casting material based on nodular graphite. Such a casting material may be heat-treated after casting so that the four-point link comprises ADI cast material (ADI=Austempered Ductile Iron).

The four-point link according to the invention forms a deformable cross, by means of which, in addition to the suspension of the vehicle axle from the vehicle frame, the function of a roll stabilizer may also be accomplished. For this purpose, the four-point link preferably forms a reversibly and/or spring-elastically deformable cross.

The invention further relates to a vehicle, in particular a commercial vehicle, comprising at least one vehicle axle, a vehicle frame and one or at least one four-point link according to the invention, wherein both first link arms are connected in an articulated manner to the vehicle frame and both second link arms are connected in an articulated manner to the vehicle axle. In this case, the four-point link may be refined according to all above mentioned embodiments. Both first link arms and both second link arms are connected in an articulated manner to the vehicle frame and/or to the vehicle axle by means of the joints. The vehicle axle is further preferably a rigid axle.

The four-point link geometry according to the invention is specially designed for flexible torsional characteristics. The deformation is absorbed by the torsionally flexible arms, by the special geometry at the center of the link and by the molecular joints, wherein the involvement of the molecular joints is preferably low. Owing to the flexible characteristic, reduced torsional moment and consequently low vertical loads act on the four-point link. Nevertheless, relatively high lateral loads may act on the four-point link.

The geometric moment of inertia of the H-shaped profile used for the link arms is more suitable than the double-T profile according to EP 0 776 275 B1.

The link arms of the four-point link converge in a cross. For the central region of the cross and/or of the four-point link, a geometry which is formed by a combination of H-shaped profiles and a tubular profile is advantageous. With this geometry, provisions have been made that material accumulations are avoided and certain wall thicknesses are observed, so that the formation of cavities in the four-point link is avoided and subsequent heat-treatment of the four-point link influences the entire cross-section thereof.

The four-point link according to the invention withstands high loads in the central region. These loads result, on the one hand, from the torsion, which can be optimally absorbed by the tubular profile, and on the other hand, from the lateral load, which in addition may be taken up by the lateral cross-members of the H-shaped profiles of the central region. These advantages are, for example, not available in a four-point link according to DE 100 50 772 A1. In the four-point link according to the invention, a homogeneous transition of the link arms to the central region is preferably present, which positively influences the operational stability of the four-point link according to the invention.

The casting core for the central region of the four-point link according to the invention is very stable due to the relatively large cross-section thereof and the comparatively short length thereof, which is no longer the case with a casting core for a cast link according to DE 10 2004 014 610 A1 if this cast link is torsionally flexible and thus has a flat configuration.

The four-point link according to the invention offers the following advantages:

The geometry thereof is especially suitable for a four-point link with a torsionally flexible characteristic.

On account of the H-shaped profile of the link arms, they can be without cores. The H-shaped profile is torsionally flexible, yet stable against lateral loads and thus ideal for the intended application.

The combination of the H-shaped profiles and tubular profiles and/or tubular cross-sections in the central region of the four-point link allows constant wall thicknesses compatible with the manufacturing process as well as a load-tolerant geometry without changes in stiffness.

A casting core has only to be used in the center for the central region. Owing to the compactness thereof, the casting core may be configured in a very stable manner, as a result of which the geometry is not limited with regard to the core stability. If there are hollow cylindrical bearing supports and/or housing heads, a casting core may also be necessary for each bearing support in addition to the casting core for the central region.

BRIEF DESCRIPTION OF THE DRAWINGS

The invention will be described hereafter with reference to the drawings based on a preferred embodiment. The drawings show.

DETAILED DESCRIPTION OF THE PREFERRED EMBODIMENTS

Figure 1:
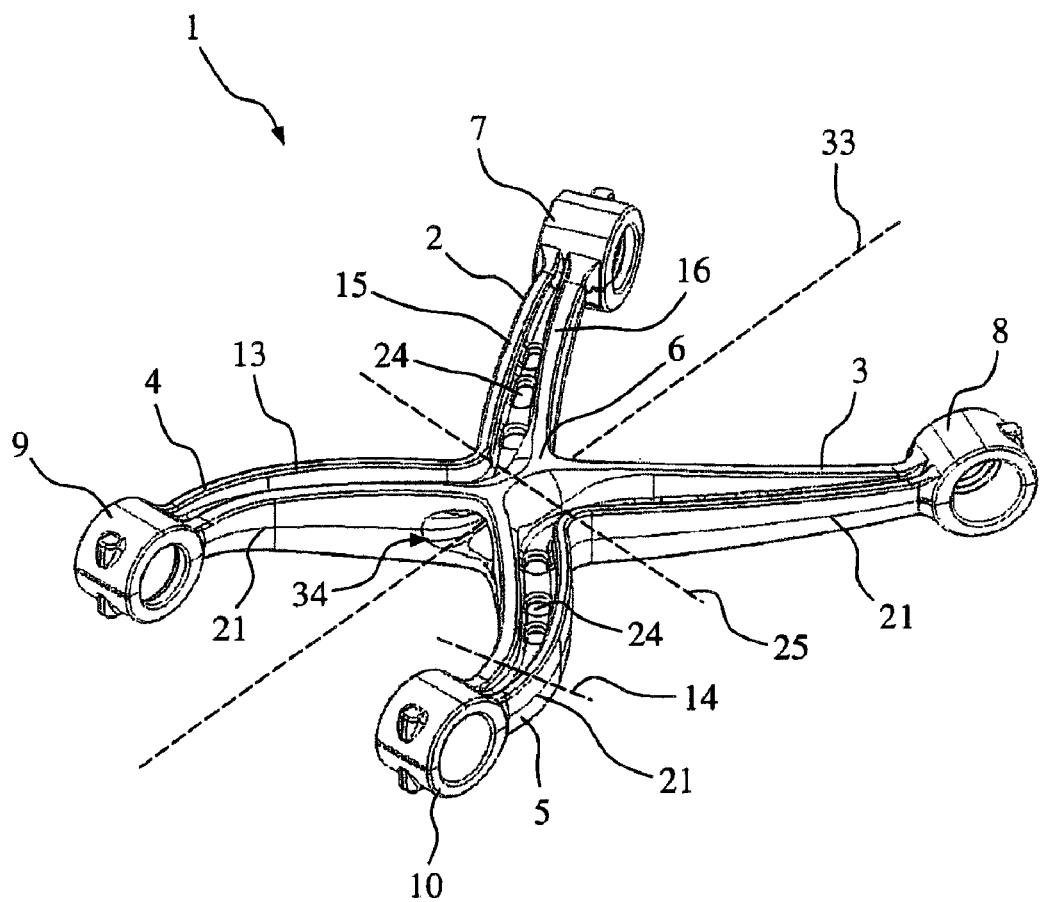
FIG. 1 a perspective view of an embodiment of the four-point link according to the invention, FIG. 2 a cross-section through one of the link arms of the four-point link according to FIG. 1, FIG. 3 a cross-section through the central region of the four-point link according to FIG. 1 and FIG. 4 a partial side view of a vehicle comprising the four-point link according to FIG. 1 in a mounted state.

From FIG. 1, a perspective view of an embodiment of the four-point link 1 according to the invention is apparent, which has four link arms 2, 3, 4 and 5 that are arranged in a cross-shaped manner and fixedly connected to one another in a central region 6 of the cross. The four-point link 1 is configured as a one-piece cast part so that the link arms 2, 3, 4 and 5 merge into one another in central region 6 in particular in a homogeneous manner in terms of materials. Furthermore, the link arms 2, 3, 4 and 5 each have a hollow cylindrical bearing support 7, 8, 9 and 10 at the sides thereof facing away from the central region 6, wherein each bearing support 7, 8, 9 and 10 is configured as one piece with the associated link arm 2, 3, 4 and/or 5. The bearing supports 7, 8, 9 and 10 in particular are part of the one-piece cast part. A molecular joint 12 (see FIG. 4) is inserted into each of the bearing supports 7, 8, 9 and 10 for mounting the four-point link 1 in a vehicle 11.

Figure 2:
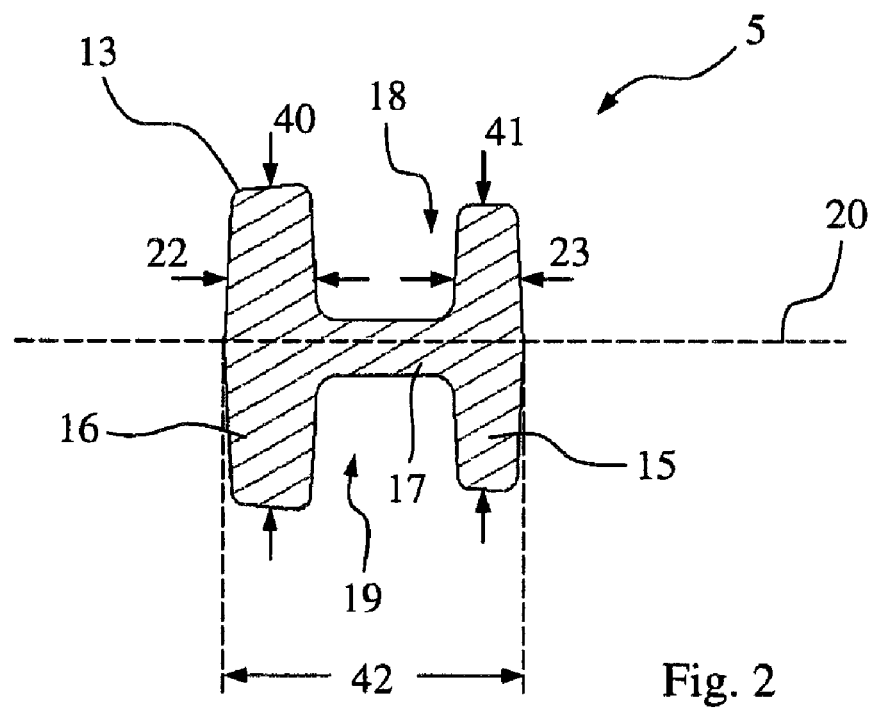

The link arms 2, 3, 4 and 5 have an H-shaped profile 13 each, which is apparent from FIG. 2 where a cross-section of the link arm 5 is shown along the intersecting line 14 from FIG. 1. Each H-shaped profile 13 has two limbs 15 and 16 which extend parallel to one another and which are centrally connected to one another by means of a cross-member 17. The limbs 15 and 16 as well as the cross-member 17 delimit two recesses 18 and 19, which are open vertically (and/or transversely) with respect to the cross plane 20 at mutually opposing sides. The cross plane 20 forms a central plane of the four-point link 1 and intersects the four-point link 1 at the lines 21 shown in FIG. 1. The cross plane 20 in particular extends through the cross-members 17 of the H-shaped profile 13. Furthermore, holes 24 are provided in the cross-members 17 of each H-shaped profile 13 and are used to discharge water and dirt (see FIG. 1).

As is apparent from FIG. 2, the thicknesses 22 and 23 of the two limbs 15 and 16 of the H-shaped profile 13 are different. Likewise, the heights 40 and 41 of the two limbs 15 and 16 of the H-shaped profile 13 are different. The width of the H-shaped profile 13 and/or of the link arm is denoted with reference numeral 42.

Figure 3:
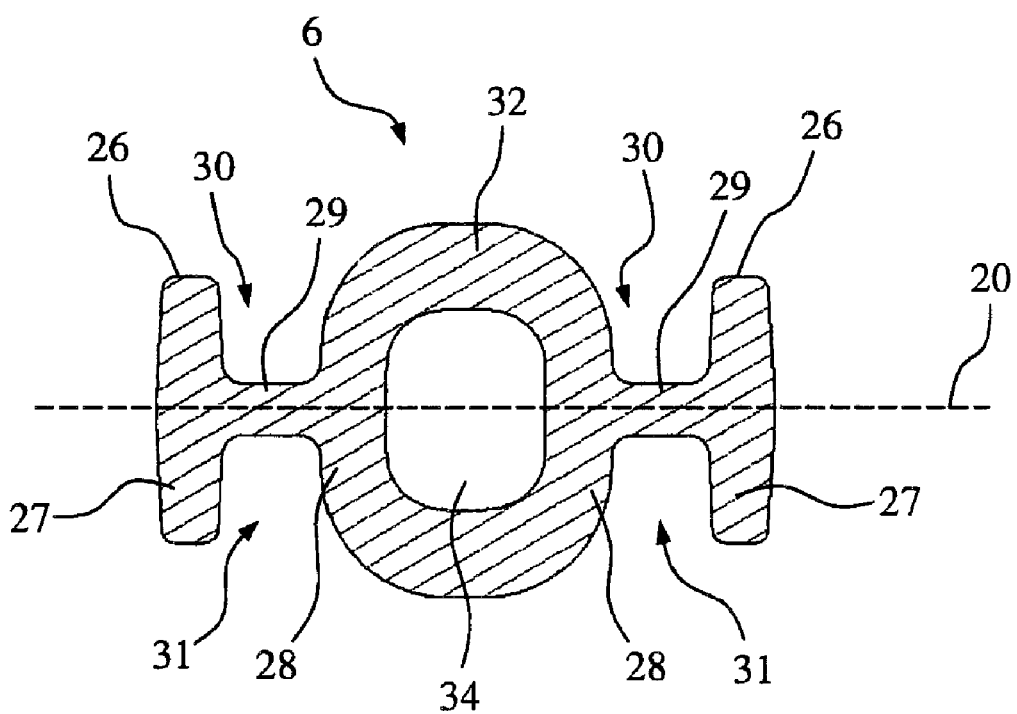

FIG. 3 shows a sectional view of the central region 6 along the intersecting line 25 from FIG. 1, which has two H-shaped profiles 26, each comprising two limbs 27 and 28 extending parallel to one another and a cross-member 29, which centrally connects the two limbs 27 and 28 of the respective H-shaped profile 26 to one another. Each H-shaped profile 26 has two recesses 30 and 31 delimited by the respective limbs 27 and 28 and by the respective cross-member 29, the recesses 30 and 31 being open vertically (and/or transversely) with respect to the cross plane 20 at mutually opposing sides. As is apparent from FIG. 3, the cross-members 29 of the H-shaped profiles 26 are located on the cross-plane 20. The two limbs 28 facing one another of the two H-shaped profiles 26 are connected to one another to form a tubular profile 32, which extends in the longitudinal direction 33 (see FIG. 1) of the four-point link 1 and includes a continuous hollow space 34, which is open on both sides in the longitudinal direction 33. The H-shaped profiles 13 of the link arms 2 and 4 merge into one of the H-shaped profiles 26 of the central region 6, and both H-shaped profiles of the link arms 3 and 5 merge into the other H-shaped profile 26 of the central region 6.

Figure 4:
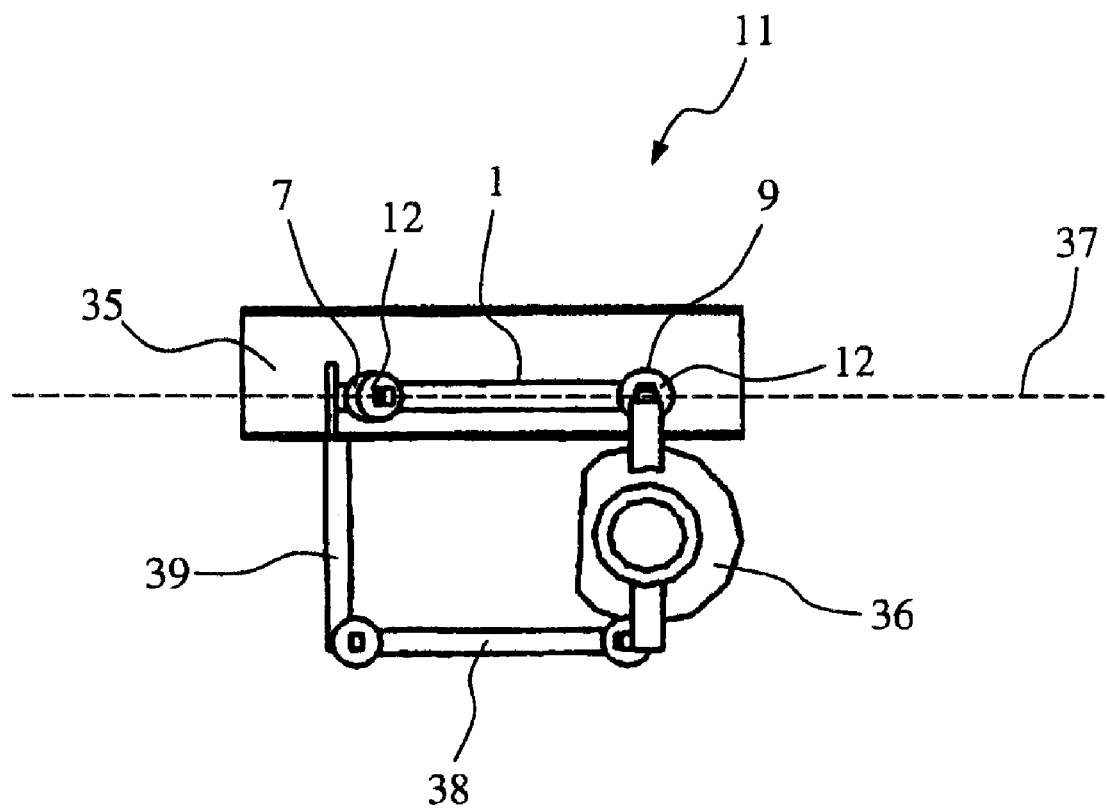

FIG. 4 shows a partial side view of the vehicle 11 comprising a vehicle frame 35, onto which the link arms 2 and 3 are connected in an articulated manner by means of two of the molecular joints 12. Furthermore, the link arms 4 and 5 are connected in an articulated manner to a vehicle axle 36 configured as a rigid axle by means of two other molecular joints 12. The dashed line 37 represents the cross plane 20 as well as the longitudinal direction 33. Although in FIG. 4 the line 37 also extends in the longitudinal direction of the vehicle, the cross plane 20 and the longitudinal direction 33 may, however, be inclined with respect to the longitudinal direction of the vehicle on compression and decompression of the vehicle axle 36 relative to the vehicle frame 35.

The vehicle axle 36 is further connected in an articulated manner to the vehicle frame 35 and/or to girders 39 by means of two longitudinal links 38, the girders being fixedly connected to the vehicle frame 35, only one of the longitudinal link arms 38 and one of the girders 39 being apparent from FIG. 4.

REFERENCE NUMERALS 1. four-point link
2. link arm
3. link arm
4. link arm
5. link arm
6. central region
7. bearing support
8. bearing support
9. bearing support
10. bearing support
11. vehicle
12. molecular joint
13. H-shaped profile
14. intersecting line
15. limb
16. limb
17. cross-member
18. recess
19. recess
20. cross plane
21. line
22. thickness
23. thickness
24. hole
25. intersecting line
26. H-shaped profile
27. limb
28. limb
29. cross-member
30. recess
31. recess
32. tubular profile
33. longitudinal direction
34. hollow space
35. vehicle frame
36. vehicle axle
37. line
38. longitudinal link
39. girder
40. height
41. height
42. width

The invention claimed is:

1. A four-point link for suspending an axle (36) on a frame (35) of a vehicle (11), the link comprising four link arms (2, 3, 4 and 5) which are fixedly connected to one another by a central region (6) and which extend away from the central region (6) to form a cross, and the four link arms (2, 3, 4 and 5) and the central region (6) together defining a cross plane (20), two first link arms (2, 3) being connected to the vehicle frame (35) in an articulated manner and two second link arms (4, 5) being connected to the vehicle axle (36) in an articulated manner, and each of the four link arms (2, 3, 4, 5) being solid and having a transverse cross sectional H-shaped profile (13), with each transverse cross sectional H-shaped profile opening vertically with respect to the cross plane (20).

2. The four-point link according to claim 1, wherein the cross plane (20) forms a center plane of the four-point link (1).

3. The four-point link according to claim 1, wherein the four link arms (2, 3, 4, 5) merge with one another, in terms of materials in a homogeneous manner, in the central region (6).

4. The four-point link according to claim 1, wherein the central region (6) has a tubular transverse cross sectional profile (32).

5. The four-point link according to claim 4, wherein the central region (6) has two H-shaped profiles (26) which both open vertically with respect to the cross plane (20), and the two H-shaped profiles (26) of the central region (6) have limbs (28) that face one another and are connected to one another to form a tubular transverse cross sectional profile (32).

6. The four-point link according to claim 5, wherein the H-shaped transverse cross sectional profiles (13) of the link arms (2, 3, 4, 5) merge with the H-shaped profiles (26) of the central region (6).

7. The four-point link according to claim 4, wherein the tubular transverse cross sectional profile (32) is open on both opposed ends thereof.

8. The four-point link according to claim 4, wherein the tubular transverse cross sectional profile (32) extends in a longitudinal direction (33) of the four-point link, and the longitudinal direction (33) extends through the central region (6) and centrally between the two first link arms (2, 3) and the two second link arms (4, 5).

9. The four-point link according to claim 1, wherein each of the four link arms (2, 3, 4, 5) has, at an end thereof remote from the central region (6), a hollow cylindrical joint receiving means (7, 8, 9, 10).

10. The four-point link according to claim 1, wherein each H-shaped profile (13; 26) is formed by two limbs (15, 16; 27, 28) and a cross-member (17; 29) which extends between the limbs (15, 16; 27, 28), and the cross-member is located in the cross plane (20).

11. The four-point link according to claim 1, wherein each transverse cross sectional H-shaped profile (13, 26) comprises a pair of spaced apart limbs (15, 16; 27, 28) and a central cross-member (17, 29) interconnects the pair of spaced apart limbs (15, 16; 27, 28) with one another and is coincident with the cross plane (20).

12. A vehicle comprising at least one vehicle axle (36), a vehicle frame (35) and at least one four-point link (1), the at least one four-point link (1) comprising:

four link arms (2, 3, 4 and 5) being fixedly connected to one another in a central region (6) and extending away from the central region (6) to form a cross, and the four link arms (2, 3, 4 and 5) and the central region (6) together defining a cross plane (20), two first link arms (2, 3), of the four link arms (2, 3, 4 and 5), being connected to the vehicle frame (35) in an articulated manner and two second link arms (4, 5), of the four link arms (2, 3, 4 and 5), being connected to the vehicle axle (36) in an articulated manner, each of the four link arms (2, 3, 4, 5) being solid and having a transverse cross sectional H-shaped profile (13), with each transverse cross sectional profile opening vertically with respect to a single cross plane (20), each transverse cross sectional H-shaped profile (13, 26) comprising a pair of spaced apart limbs (15, 16; 27, 28) and a central cross-member (17, 29) interconnecting the pair of spaced apart limbs (15, 16; 27, 28) with one another and being coincident with the cross plane (20); and the two first link arms (2, 3) each being connected to the vehicle frame (35) by a first joint (12) and the two second link arms (3, 4) each being connected to the vehicle axle (36) by at least one second joint (12).

13. The vehicle according to claim 12, wherein the first and the second joints (12) are molecular joints.

14. The vehicle according to claim 12, wherein the vehicle axle (36) is a rigid axle.

15. The four-point link according to claim 12, wherein the four link arms (2, 3, 4, 5) merge with one another in the central region (6) and each of the four link arms (2, 3, 4, 5) has, at an end thereof remote from the central region (6), a hollow cylindrical joint receiving aperture (7, 8, 9, 10).

16. The four-point link according to claim 12, wherein a thickness of each of the pair of spaced apart limbs (15, 16; 27, 28) is different from one another.

17. The four-point link according to claim 12, wherein a height of each of the pair of spaced apart limbs (15, 16; 27, 28) is different from one another.

18. The four-point link according to claim 12, wherein both a thickness and a height of each of the pair of spaced apart limbs (15, 16; 27, 28) are different from one another.

19. The four-point link according to claim 12, wherein at least one hole is formed in the central cross-members of each H-shaped profile for discharging at least one of water and dirt.

20. A four-point link for suspending an axle (36) on a frame (35) of a vehicle (11), the four-point link comprises:

two first link arms (2, 3) and two second link arms (4, 5), each of the two first link arms (2, 3) and the two second link arms (4, 5) being integrally connected with one another in a central region (6) of the four-point link (1), the two first link arms (2, 3) and the two second link arms (4, 5) extending from the central region (6) and defining a transverse cross plane (20) such that the four-point link (1) lies in the cross plane (20) and is in a form of a cross;

remote ends of each of two first link arms (2, 3) and remote ends of the two second link arms (4, 5) each having a hollow cylindrical bearing support (7, 8, 9, 10), the bearing supports (7, 8) of the two first link arms (2, 3) coupling a first end of the four-point link (1), in an articulated manner, to the vehicle frame (35), and the bearing supports (9, 19) of the two second link arms (4, 5) coupling a second end of the four-point link (1), in an articulated manner, to the vehicle axle (36);

each of the two first link arms (2, 3) and the two second link arms (4, 5) has an H-shaped cross sectional profile (13); and the central region (6) of the four-point link (1) has a cross sectional profile (32) formed by two outer limbs (27), two cross members (29) and a centrally located tubular profile (32).

* * * * *